(12) United States Patent
Lehmann et al.

(10) Patent No.: US 12,474,247 B2
(45) Date of Patent: Nov. 18, 2025

(54) INSULATING FLUID MONITORING BLOCK AND MOUNTING METHOD

(71) Applicant: Siemens Energy Global GmbH & Co. KG, Munich (DE)

(72) Inventors: Thomas Lehmann, Berlin (DE); Robert Grünler, Oranienburg (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 123 days.

(21) Appl. No.: 18/261,197

(22) PCT Filed: Dec. 22, 2021

(86) PCT No.: PCT/EP2021/087324
§ 371 (c)(1),
(2) Date: Jul. 12, 2023

(87) PCT Pub. No.: WO2022/152537
PCT Pub. Date: Jul. 21, 2022

(65) Prior Publication Data
US 2024/0085293 A1    Mar. 14, 2024

(30) Foreign Application Priority Data
Jan. 14, 2021    (DE) .................... 10 2021 200 290.0

(51) Int. Cl.
*G01N 9/00*    (2006.01)
(52) U.S. Cl.
CPC ..................... *G01N 9/00* (2013.01)
(58) Field of Classification Search
CPC ....................................... G01N 9/00

USPC ........................................... 73/32 R
See application file for complete search history.

(56) References Cited

U.S. PATENT DOCUMENTS

| | | |
|---|---|---|
| 4,772,132 A | 9/1988 | Hofmann |
| 8,442,775 B2 | 5/2013 | Santos |
| 8,973,423 B2 | 3/2015 | Heckler et al. |
| 9,263,212 B2 | 2/2016 | Hensberger et al. |
| 10,305,265 B2 | 5/2019 | Boettcher et al. |
| 10,670,503 B2 | 6/2020 | Brand |
| 10,746,311 B2 | 8/2020 | Halbheer et al. |
| 2014/0224770 A1* | 8/2014 | Hensberger .......... H01H 33/563 73/30.01 |

FOREIGN PATENT DOCUMENTS

| | | | |
|---|---|---|---|
| DE | 10036071 A1 * | 2/2002 | .......... H01H 33/563 |
| DE | 102016123588 A1 | 1/2018 | |
| EP | 2553416 B1 | 12/2016 | |

(Continued)

OTHER PUBLICATIONS

Bastian. Machine Translation of DE-10036071-A1. Published Feb. 2022. Translated Dec. 2024. (Year: 2002).*

*Primary Examiner* — Walter L Lindsay, Jr.
*Assistant Examiner* — Philip T Fadul
(74) *Attorney, Agent, or Firm* — Laurence A. Greenberg; Werner H. Stemer; Ralph E. Locher (57) ABSTRACT

An insulating fluid monitoring block includes an insulating fluid channel. The insulating fluid channel is connected through a branch channel to a cutout. A sensor element is at least partly disposed in the cutout. The sensor element serves for monitoring an insulating fluid. A mounting method for an insulating fluid monitoring block is also provided.

13 Claims, 4 Drawing Sheets

(56) References Cited

FOREIGN PATENT DOCUMENTS

| EP | 3081907 | B1 | 7/2020 |
|---|---|---|---|
| JP | H08271477 | A | 10/1996 |
| JP | 2002271926 | A | 9/2002 |
| WO | WO 2019068617 | A1 | 4/2019 |

* cited by examiner

FIG 4

INSULATING FLUID MONITORING BLOCK AND MOUNTING METHOD

The invention relates to an insulating fluid monitoring block comprising a supporting body having an insulating fluid channel with an inlet opening.

Such an insulating fluid monitoring block is known, for example, from the laid-open specification DE 100 36 071 A1. In said document, an insulating fluid monitoring block which comprises a supporting body is described. The supporting block is also equipped with an insulating fluid channel. In the case of the known insulating fluid monitoring block, a pressure measuring device and a density monitoring device can be connected to the supporting body. In the case of the known construction, it has proven to be disadvantageous that retrofitting in existing structures is possible only with difficulty. In particular, it is more difficult than coupling the two known devices for measuring pressure and monitoring density.

It is therefore the object of the invention to specify an insulating fluid monitoring block which opens up broader use possibilities.

According to the invention, the object is achieved in the case of an insulating fluid monitoring block of the type mentioned in the introduction in that the supporting body comprises a cutout into which a sensor element at least partially projects.

An insulating fluid monitoring block is used to monitor an electrically insulating fluid with regard to its state. This monitoring can preferably be effected continuously, but provision may also be made for merely intermittent monitoring to be performed.

Electrically insulating fluids are used, for example, in electrical energy transmission devices. Electrically insulating fluids are for example gases or liquids. Electrically insulating liquids are for example substances such as insulating oils, insulating esters or other electrically insulating liquids with a sufficient electrical dielectric strength. The use of electrically insulating liquids has proven to be suitable for example in transformers, measuring transducers, switchgear, etc. Electrically insulating fluids in the gaseous state are substances which exhibit a gaseous state in particular under operating conditions. Electrically insulating fluids are for example gases such as nitrogen, oxygen, carbon dioxide, etc. Furthermore, fluorine-containing substances (in particular organofluorides) can be used in the gaseous state. Such fluoride-containing substances are for example fluoroketones, fluoronitriles, fluoroolefins, etc. Furthermore, it is alternatively possible for inorganic fluids such as sulfur hexafluoride to be used. In addition to a single-type use of various fluids, mixtures may also be used. Mixing ratio and combination can be adjusted as required depending on the intended purpose. For example mixtures with nitrogen, oxygen and an organofluoride, in particular fluoronitrile, have proven to be advantageous.

Provision may preferably be made for the electrically insulating fluid to be enclosed in a hermetically closed housing (encapsulation housing). Undesired volatilization of same is thus avoided. In order to further increase the electrical insulation strength, provision may be made for the electrically insulating fluid within the housing to be placed and a positive pressure. That is to say that the pressure of the electrically insulating fluid within the housing is higher than the pressure in the environment of the housing. An insulating fluid channel makes it possible to, for example, allow insulating fluid enclosed within a housing to pass into the supporting body and to be conducted within the supporting body. The insulating fluid channel makes it possible to allow the electrically insulating fluid to correspond with different zones/regions. The insulating fluid channel is delimited by walls which have a sufficient tightness in relation to the electrically insulating fluid used. By way of example, the walls of the insulating fluid channel may be delimited by a metal. In this case, provision may preferably be made for the supporting body to be manufactured from a fluid-tight material, preferably a metal.

A cutout in the supporting body makes it possible to create a shielded space into which a sensor element can project. In this case, the sensor element is preferably at least partially exposed to the electrically insulating insulating fluid to be monitored. Particularly when using a supporting body composed of a metallic material, the dielectrically shielding action thereof can be used to assist the measurement accuracy of the sensor element. As an alternative, provision may also be made for merely regions of the supporting body to be of electrically conducting configuration, in order to obtain a dielectric shielding action. By way of example, surfaces of the supporting body may comprise corresponding coatings. It is thus for example possible for the cutout or regions around the cutout in the supporting body to comprise a dielectrically effective, in particular metallic coating. It is analogously also possible for an insulating fluid channel to be lined with a corresponding coating. The cutout may correspondingly be at least partially filled with the insulating fluid to be monitored or to be examined. To this end, provision may be made for, for example, a sample of the insulating fluid to be introduced into the cutout.

A further advantageous configuration may provide for the cutout to be correspondingly connected to the insulating fluid channel.

A correspondence of the cutout with the insulating fluid channel makes it possible to allow electrically insulating insulating fluid to be monitored to flow over into the cutout. By way of example, provision may be made for the cutout to constantly be connected to the insulating fluid channel, as a result of which it is constantly possible for the insulating fluid to flow through the cutout. Within the cutout, the insulating fluid located therein can then be sampled by way of the sensor element, which can at least partially project into the cutout. Particularly when using an insulating fluid under positive pressure, provision may be made for the cutout to be designed in such a way that the electrically insulating insulating fluid is at the same pressure in said cutout as in the insulating channel. The cutout should advantageously be configured as a pressure-resistant hermetically closed barrier (for example as part of an encapsulation), such that undesired leakage of insulating fluid via the cutout is impeded. In order to enable a correspondence with the insulating fluid channel, the insulating fluid channel may, for example, open out in the cutout, pass through the cutout, be tangent to the cutout or a separate channel may provide a connection between the insulating fluid channel and the cutout.

Advantageously, provision may further be made for the cutout to be correspondingly connected to the insulating fluid channel by way of a branch channel.

A branch channel between the insulating fluid channel and the cutout makes it possible to allow insulating fluid located in the insulating fluid channel to pass into the cutout. To this end, the branch channel may advantageously be provided exclusively to ensure a connection between the insulating fluid channel and the cutout. It is for example possible for the branch channel to branch off in the manner of a branch from the insulating fluid channel. A linear course may preferably be provided both for the insulating fluid channel and for the branch channel. This makes it possible, in particular, to provide simplified manufacturing methods. By way of example, the supporting body together with channels, such as insulating fluid channel and branch channel, can be produced by subtractive manufacturing methods. A right-angled positioning may preferably be provided between the insulating fluid channel and the branch channel, and thus it is possible to form a branch which has a substantially T-shaped orientation.

Advantageously, provision may further be made for the sensor element to be, at least in certain portions, part of a fluid-tight closure means of the cutout.

A fluid-tight closure means serves to close or subdivide the cutout at least in certain portions, such that an insulating fluid located therein cannot leak directly from the cutout. The closure means may form a hermetic barrier within the cutout. A closure means may for example be a cover or an intermediate wall or a stopper, etc. The closure means may span the cutout or extend through the cutout. Provision may be made for the closure means to be arranged within the cutout, such that the cutout is subdivided into a first portion and a second portion. The first portion may, for example, be declared as active part; the second portion may be declared as passive part. The first portion may be exposed to the insulating fluid. The fluid-tight closure means prevents the insulating fluid from passing from the first portion into the second portion. The closure means may separate a region (first volume, first portion) provided for receiving the insulating fluid within the cutout from the total volume of the cutout. The first portion may, for example, directly adjoin a mouth opening of a channel, for example of a branching channel. The first portion may for example also be designed such that the active part of the sensor element is located directly at the mouth opening of the above channel, with the result that the first portion is almost completely formed by the mouth opening. The second portion may, for example, be used to receive a passive part of the sensor element. It is for example possible for a data processing device, a data interface or similar to be accommodated in said second portion.

Provision may further be made for the closure means to form a fluid-tight barrier by means of a material bond. This may for example be effected by virtue of the closure means being introduced in liquid form into the cutout and being cured there and thus effecting a material bond, in order to provide an angularly rigid closure means. In this case, the sensor element may form, at least in certain portions, a part of the fluid-tight closure means. By way of example, the sensor element may pass through the closure means or be embedded into the closure means. A passing-through or embedding in the closure means additionally has the advantage that the sensor element is exposed, at least in certain portions, to the electrically insulating insulating fluid (active part) and also access to the sensor element (passive part) outside the electrically insulating insulating fluid is given. In addition to an embedding or passing-through arrangement, the sensor element may also be configured as part of a discrete assembly, for example of a cover which spans the cutout.

Advantageously, provision may further be made for the cutout to be spanned and closed by a cover.

A cover may for example be provided as an alternative or in addition to a potting of the cutout. It is for example possible for the cover itself to ensure a fluid-tight closure of the cutout. However, provision may also be made for the cover, independently of a fluid-tight mode of action of same, to additionally span the cutout. This has the advantage that the functionality of the hermetic closure of the electrically insulating fluid from the environment is separated from a function of the cover. There is thus the possibility of, on the one hand, receiving within the cutout the electrically insulating insulating fluid to be monitored, and of, on the other hand, arranging further assemblies necessary for the function of the sensor element in the same cutout so as to be separated from the electrically insulating insulating fluid. In this case, the sensor element may also pass through the cover or be part of the cover. Depending on requirements, the cover can form different tightnesses when spanning the cutout. By way of example, the cover may give rise to a fluid-tight and/or pressure-resistant closure of the cutout. However, as an alternative, the cover may also ensure merely a touch protection, wherein, in comparison with a fluid-tight embodiment, relatively coarse material can pass into the cutout via a cover assemblage.

A further advantageous configuration may provide for the cover to comprise a data interface.

The cover serves to span the cutout, such that the cutout is shielded. To this end, the cover is preferably supported on the inner wall/end face of walls which delimit the cutout. There, the cover may undergo an angularly rigid fixing. This may, for example, be realized by a screw-fastening connection, an interference fit, or in some other way. Preferably, reversible detachment of the cover should be possible. The cover thus forms a closure of the cutout such that the latter cannot be accessed directly from the outside. Correspondingly, it is advantageous for the cover to comprise a data interface. Information which is outputted by the sensor element can be outputted into the environment of the insulating fluid monitoring block by way of the data interface. The arrangement of the interface on/in the cover provides the possibility of providing different interfaces depending on the preferred transmission medium. By way of example, the interface may be configured in the form of a line-connected interface, for example may comprise a plug-in connection for transmitting electrical or optical pulses via a line. To this end, the interface may be configured, for example, in the form of a coupling contact, a plug-in contact, etc. However, provision may also be made for a non-line-connected coupling means to be provided. In this case, the interface for example comprises a transmitter and/or receiver for transmitting electrical pulses. This may, for example, be an antenna for transmitting high-frequency signals or contain an optical coupling for transmitting information in the visible or non-visible light range. The insulating fluid monitoring block or the sensor element of the insulating fluid monitoring block may also be coupled to a data bus by way of the data interface. Such a data bus is preferably a data bus which operates in accordance with the Modbus protocol. Using a cable harness, it is possible, when using a "Daisy Chain", for a plurality of sensors of one or more insulating fluid monitoring blocks to be connected to one another.

The data interface may be arranged on an inner side or an outer side or on both sides of the cover, passing through the cover. Furthermore, the arrangement of a data interface on the cover affords the advantage that the data interface can be coupled to the respective sensor element in a variable manner. Thus, different sensors can be used to complete the insulating fluid monitoring block and different interfaces can be used as required. Correspondingly, provision may be made for the data interface to be connected to the sensor element, arranged in the cutout, on the inner sheath side of the cover. Different data interfaces can then be provided on different covers as required, such that flexible adaptation of preferred transmission type and preferred sensor element can be performed. This enables a modular construction of an insulating fluid monitoring block.

Advantageously, provision may further be made for the sensor element to comprise an active part and a passive part, wherein the active part is correspondingly exposed to the insulating fluid channel and the passive part serves to process the information from the active part.

An active part of a sensor element so as to detect a physical variable of an insulating fluid. To this end, the active part is at least partially exposed to the insulating fluid. A passive part of a sensor element serves to transform and process information obtained by the active part. The possibility is thus provided of keeping the passive part free from impingement with the insulating fluid. Furthermore, the active part is separated from the assemblies of the passive part. The structural volume of the active part and the structural volume to be exposed to the insulating fluid is thus reduced. As such, provision may for example be made for the active part to for example be part of a fluid-tight barrier, which delimits the cutout in a fluid-tight manner such that an escape of insulating fluid via the cutout is impeded. There is a communication channel (for example line-connected or non-line-connected) between the active part and the passive part in order to transmit information from the active part to the passive part. The passive part of the sensor element should preferably be arranged outside the insulating fluid and thus outside a hermetic encapsulation for the insulating fluid. There, there may be a suitable atmosphere which assists the functioning of the sensor element, in particular the passive part thereof. From the passive part of the sensor element, there may be a connection to a data interface via which information which has been processed further in the passive part can be provided, for example, to a superordinate monitoring or control system. This data interface is preferably arranged on a cover which spans the cutout. Advantageously, the passive part is at least partially arranged within the cutout. When using a fluid-tight closure element which constitutes a barrier within the cutout, a mounting space within which the passive part at least partially extends may be created on the side facing away from the insulating fluid.

Advantageously, provision may further be made for the inlet opening to be controlled by a valve body of an inlet fitting.

An inlet fitting serves to close the inlet opening of the insulating fluid channel. The inlet fitting thus forms a standardized interface, in order to connect the insulating fluid channel to an interface of identical but opposed configuration. If the inlet fitting is now used for arrangement of a valve, the accessibility of the inlet opening can be controlled by way of the valve body of the valve. By way of example, provision may be made for the insulating channel to comprise an actuating means in order to bring the valve body into an open or closed position. An accessibility of the inlet opening is thus controlled by way of the inlet fitting. This has the advantage that the inlet fitting can for example be mounted without fear of a relatively great loss of insulating fluid. It is only in the case of a sufficiently fluid-tight assemblage of the inlet fitting with the inlet opening or a wall of the supporting body, said wall delimiting the inlet opening, that the inlet opening of the insulating fluid channel is released by way of the valve body and insulating fluid can pass through the inlet opening into the insulating fluid channel.

Advantageously, provision may further be made for the insulating fluid channel to have a linear course and for an outlet opening to be arranged at an opposite end to the inlet opening.

A linear course of an insulating fluid channel allows an insulating fluid channel to be introduced into a supporting body by subtractive manufacturing methods. By way of example, the insulating fluid channel may have an essentially circular cross section, a rectangular cross section, an elliptical cross section, etc., which extends through the supporting body. In this case, the inlet opening and the outlet opening preferably lie on faces (sides) of the supporting body which are oriented oppositely to one another. When using a substantially cuboid supporting body, the inlet opening and the outlet opening are preferably located in faces which lie parallel to one another and which are oriented oppositely to one another. In this case, the inlet opening and the outlet opening are delimited by the body edges or faces into which they open out or by which they are surrounded. The inlet opening and the outlet opening delimit the insulating fluid channel in terms of its course within the supporting body. In addition to a linearly running insulating fluid channel, it is also possible to provide a branch channel or further channels which preferably likewise have a linear course. Preferably, the linear axis of the respective insulating fluid channel should lie perpendicular to the faces into which the mouth opening opens out in each case.

A further advantageous configuration may provide for the supporting body to be of substantially cuboid shape, in particular of cubic shape.

A supporting body should preferably have a cuboid shape. This enables a simplified processing and compatibility with further assemblies. On a cuboid, the available sides lie substantially at right angles to one another. This makes it possible to introduce insulating fluid channels, branch channels, etc. into supporting bodies in a simple manner. Furthermore, interfaces on the supporting body are thus foreseeable in a simple form. Furthermore, it is possible to introduce a cutout into a face of the cuboid in a simplified manner. Preferably, a cutout penetrating in the manner of a blind hole should lie substantially at right angles to a linear course of an insulating fluid channel. The cutout may, for example, have a right-angled base area, a polygonal base area, an elliptical base area or a circular base area, etc. The penetration axis of the cutout is preferably oriented at right angles to a linearly running insulating fluid channel. A branch channel which is possibly to be provided then preferably extends parallel to the penetration axis of the cutout. If the supporting body is of substantially cubic configuration, a similar design of the faces of the supporting body is produced. In this way, the applicability of such a cubic supporting body is additionally simplified. Mouth openings, cutouts, channels, etc. may preferably lie centrally in the respective cube face.

A further advantageous configuration may provide for the inlet opening and the outlet opening to be closed by an inlet fitting and an outlet fitting which each have fastening points distributed around the inlet opening and the outlet opening, said fastening points being arranged offset relative to one another in an alignment direction.

An inlet fitting and an outlet fitting make it possible to close the inlet opening and the outlet opening, respectively, and to produce a defined transition. The fittings make it possible for the insulating fluid channel to adjoin a fluid volume, in particular a gas volume. To this end, the inlet fitting and the outlet fitting may have corresponding plug-like or socket-like configurations. In this case, provision may be made for the inlet opening and the outlet opening to each be of similar construction, such that similar identical but opposed interfaces can be connected both to inlet opening and to outlet opening. Furthermore, provision may be made for the inlet fitting and the outlet fitting to have identical but opposed interfaces, such that a concatenation of a plurality of insulating fluid monitoring blocks is made possible by way of their respective inlet fitting and outlet fittings. It is thus possible to realize a chain-like concatenation of a multiplicity of insulating fluid monitoring blocks in a simple manner. This makes it possible to use different insulating fluid monitoring blocks which are equipped with different sensor elements monitoring different physical parameters of an insulating fluid.

In order to connect the inlet and the outlet fitting to the supporting body and to close a mouth opening (inlet opening and outlet opening, respectively), corresponding fastening points should be provided. A plurality of fastening points may be arranged distributed in each case around the inlet opening and outlet opening. It is preferably possible to provide a plurality of fastening points which are arranged distributed, for example, on similar circular paths around the inlet opening and the outlet opening. If an offset of the fastening points on inlet opening and outlet opening is now provided in an alignment direction (in the case of a linear design of the insulating fluid channel, alignment direction equals channel direction), it is thus possible to connect an inlet fitting and an outlet fitting independently of one another to the supporting body and to in this case use fastening means such as bolts which overlap in the alignment direction. As a result, it is also possible in the case of short supporting bodies (cubic) to obtain a sufficient anchoring of the connecting elements (fastening means) for the inlet fitting and outlet fitting, the fastening points or connecting points being arranged offset relative to one another. Thus, it is for example possible to use similar fastening points for the fittings and to flexibly exchange inlet fitting and outlet fitting for one another.

A further advantageous configuration may provide for the inlet opening to comprise an actuating element for a valve body for controlling an access to the insulating fluid channel.

The accessibility of the inlet opening may for example be controlled by means of a valve or a valve body. The equipping of the inlet opening with an actuating means offers the possibility of releasing or shutting off the mouth opening of the insulating channel in dependence on the position of the inlet opening relative to another element, for example an inlet fitting. The actuating element may actuate the valve body for example in a travel-controlled manner. The actuating element may for example be a plunger which pushes the valve body out of its shut-off seat counter to a spring force. It is for example possible, in the course of mounting of the insulating fluid monitoring block, in the case of a sufficient presence of a sealing seat, for insulating fluid to be monitored to be allowed to flow into the mouth opening in a travel-controlled manner, such that the insulating fluid channel is filled.

A further advantageous configuration may provide for the insulating fluid channel to be coupled to a gas space of an encapsulation housing of an electrical energy transmission device.

An electrical energy transmission device is a device which is used to transmit an electrical current between two points in a manner driven by a voltage difference. Such electrical energy transmission devices are, for example, fluid-insulated switching installations, fluid-insulated circuit breakers, fluid-insulated transformers, fluid-insulated measuring transducers, etc. Such fluid-insulated electrical energy transmission devices comprise an encapsulation housing, in the interior of which an electrically insulating fluid is hermetically housed and closed. Phase conductors arranged in the interior of the encapsulation housing are flowed around by the fluid housed therein and electrically insulated by this fluid. To ensure the insulation strength of the fluid insulation in the interior of the encapsulation housing, insulating fluid monitoring blocks are used. To this end, an insulting fluid channel is connected to the gas space, which is located in the interior of the encapsulation housing and is filled with the insulating fluid. The insulating fluid enclosed within the encapsulation housing flows via the insulating fluid channel into the insulating fluid monitoring block. The insulating fluid can now be monitored at or in the insulating fluid monitoring block.

Advantageously, insulating fluid monitoring blocks are connected to encapsulation housings of electrical energy transmission devices which transmit electrical energy in the medium-voltage and high-voltage range. Customary voltage levels in this case are voltages above 10,000 V, above several 10,000 V, several 100,000 V up into the million volt range.

A further object of the invention is to specify a mounting method by means of which an insulating fluid monitoring block can be fixed at its working location in a simple and efficient manner.

In the case of a method for mounting an insulating fluid monitoring block comprising a supporting body having an insulating fluid channel with an inlet opening, the object is achieved in that an inlet fitting is connected to a fluid container wall and the inlet opening of the insulating fluid channel is closed with the inlet fitting.

An insulating fluid monitoring block serves to monitor an insulating fluid. An insulating fluid is, for example, an electrically insulating gas or an electrically insulating liquid, which is preferably hermetically enclosed within an encapsulation (encapsulation housing) which is delimited by a fluid-tight container wall. A phase conductor may for example be arranged within the encapsulation, said phase conductor being flowed around and electrically insulated by the electrically insulating insulating fluid.

In order to ensure the insulation strength and the electrical stability within the encapsulation, the insulating fluid should be monitored/examined. Such an examination can be effected using an insulating fluid monitoring block. To this end, the insulating fluid monitoring block should be impinged with the insulating fluid. In particular, the insulating fluid should be introduced into the insulating fluid channel.

Advantageously, provision may in this case be made for an inlet fitting to firstly be connected to a fluid container wall (encapsulation housing wall). This connection should be of fluid-tight embodiment. The inlet fitting in this case serves to close an inlet opening of an insulating fluid channel, said inlet opening being arranged in the supporting body. After the inlet fitting as being connected to an encapsulation housing wall, it is now possible for the inlet opening of the insulating channel to be closed with the inlet fitting. To this end, provision may for example be made for the supporting body to be connected to the inlet fitting in an angularly rigid manner, such that an inlet opening located therein is delimited by the inlet fitting.

A further advantageous configuration may provide that, in a common working step, an outlet opening of the insulating fluid channel is closed with an outlet fitting and the inlet opening is closed with an inlet fitting.

The use of a common working step in order to close the outlet opening and the inlet opening with an outlet fitting and, respectively, with an inlet fitting at virtually the same time has the advantage that a simplified mounting of the insulating fluid monitoring block can be performed. By way of example, a common working step may be enforced by virtue of the inlet fitting and the outlet fitting being fixed by means of common fastening means (e.g. long bolts). It is thus also possible to ensure that a correct orientation of the two fittings with respect to one another relative to the inlet opening and the outlet opening is enforced. Furthermore, material may be saved since for example common fastening bolts for the fastening of both fittings together can be used. Furthermore, this has the advantage that, for example, the insulating fluid monitoring block can be mounted with an application of pressure to the insulating fluid within an encapsulation housing. Due to the temporarily simultaneous mounting, it is possible to ensure that the fittings are sufficiently sealed and that insulating fluid flows over into the insulating fluid channel in a manner controlled by the progression of the sealing action. In a common working step, it is thus possible to connect the fittings and close the inlet opening and the outlet opening and to additionally also provide the prerequisite to enable a pressurization or through-flow of the insulating fluid channel. Equally, a replacement or exchange of fittings is made possible by the use of a common working step and an advantageously resultant use of common fastening means for fastening of the outlet fitting and for fastening of the inlet fitting.

Advantageously, provision may further be made for an outlet opening of the insulating fluid channel to be closed with an outlet fitting prior to a closure of the inlet opening with the inlet fitting.

Using two working steps in order to firstly close the outlet opening with the outlet fitting and then close the inlet opening with the inlet fitting offers the possibility of placing the fittings in front of the opening and fixing them there independently of one another. Although a further working step in relation to a common fastening of same is therefore necessary, it is possible to individually adjust fittings and openings with respect one another. Equally, a replacement or exchange of fittings is made possible by the use of two working steps and an advantageously resultant use of different fastening means for fastening of the outlet fitting and for fastening of the inlet fitting.

Advantageously, provision may further be made that, with the closure of the inlet opening by the inlet fitting, a valve body is actuated by way of an actuating element.

With a closure of the inlet opening by the inlet fitting, there is the possibility of actuating a valve body with progression of the completion of the insulating gas monitoring block, said valve body being opened as soon as a sealing assemblage between the inlet opening and the inlet fitting is provided. In this case, the valve body may be part of a valve which is arranged in the inlet fitting. The inlet opening may for example contain an actuating element which actuates the valve body as soon as there is a sufficient sealing assemblage between inlet opening and inlet fitting. Conversely, in the case of a demounting operation, it is thus possible for the valve to be closed by way of the actuating means prior to a cancelation of a sealing assemblage between inlet opening and inlet fitting.

An exemplary embodiment of the invention will be shown schematically below in a drawing and will be described in more detail below.

Figure 1:
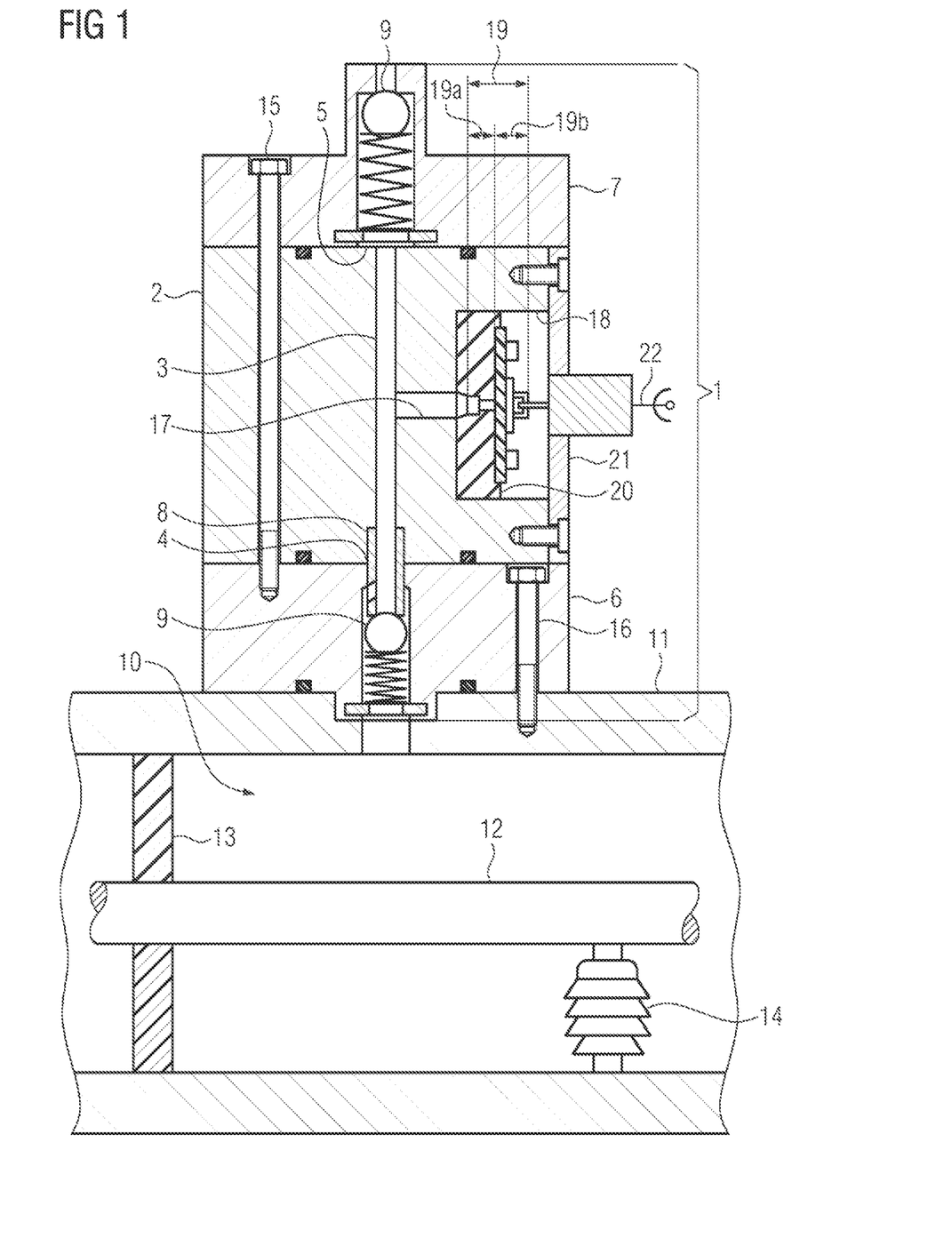
FIG. 1 shows a section through an insulating fluid monitoring block in the mounted state.

FIG. 1 shows a section through a schematically constructed insulating fluid monitoring block 1. The insulating fluid monitoring block 1 comprises a supporting body 2. In the present case, the supporting body 2 is by way of example a metallic block of cuboid shape, in particular of cubic shape. The supporting body 2 is passed through by an insulating fluid channel 3. The insulating fluid channel 3 has a linear extent. The insulating fluid channel 3 comprises an inlet opening 4 and an outlet opening 5. The inlet opening 4 and the outlet opening 5 each lie in faces (sides) of the supporting body 2 which are oriented oppositely to one another. Those sides of the supporting body 2 which in each case delimit the outlet opening 5 and the inlet opening 4 are of substantially planar configuration and are oriented oppositely to one another. The insulating fluid channel 3 in this case lies with its inlet and outlet openings 4, 5 substantially centrally in the faces delimiting the inlet and outlet opening 4, 5. The inlet opening 4 is closed by an inlet fitting 6. The outlet opening 5 is closed by an outlet fitting 7. In the present case, the inlet fitting 6 and the outlet fitting 7 are also of metallic form and bear sealingly against the supporting body 2. To this end, annular grooves are introduced into the respective face of the supporting body 2 so as to run around the inlet opening 4 and the outlet opening 5 (as an alternative or in addition, an arrangement of an annular groove in the inlet fitting 6 and/or in the outlet fitting 7 is also possible), said annular grooves containing sealing rings which each seal a joining gap between the inlet fitting 6 and the outlet fitting 7 and the supporting body 2. The inlet opening 4 is equipped with an actuating means 8 which is embodied in the form of a sleeve-like plunger, forming a sleeve channel. The actuating means 8 serve to actuate a valve body 9 of a valve, which is arranged in the inlet fitting 6. By way of the valve body 9, the inlet opening 4 of the insulating fluid channel 3 can correspond with a gas space 10 or be shut-off from the latter in dependence on the relative position of the supporting body 2 and the inlet fitting 6. To this end, the inlet fitting 6 is connected in an angularly rigid and sealed manner to an encapsulation wall 11 which delimits the gas space 10. By way of the inlet fitting 6 and the valve body 9 of the valve located therein, an access through the wall of the encapsulation housing 11 into the gas space 10 is made possible, this access being opened and closed by way of the valve body 9. The gas space 10 is part of an electrical energy transmission device, in the interior of which a phase conductor 12 is arranged. The phase conductor 12 serves to guide an electrical current which is driven by an application of voltage. In this case, the phase conductor 12 is held in an electrically insulated manner relative to the encapsulation housing 11 for example by way of a disk insulator 13 or a post insulator 14. The encapsulation housing 11 is for example manufactured from an insulating material or electrically conducting material. An electrically insulating fluid located in the gas space 10 serves to insulate the phase conductor 12 by virtue of the electrically insulating fluid flowing around the phase conductor 12. In order to increase the dielectric strength of the electrically insulating fluid, the electrically insulating fluid may be placed under an elevated pressure which is for example higher than the pressure in the external environment of the encapsulation housing 11.

Figure 2:
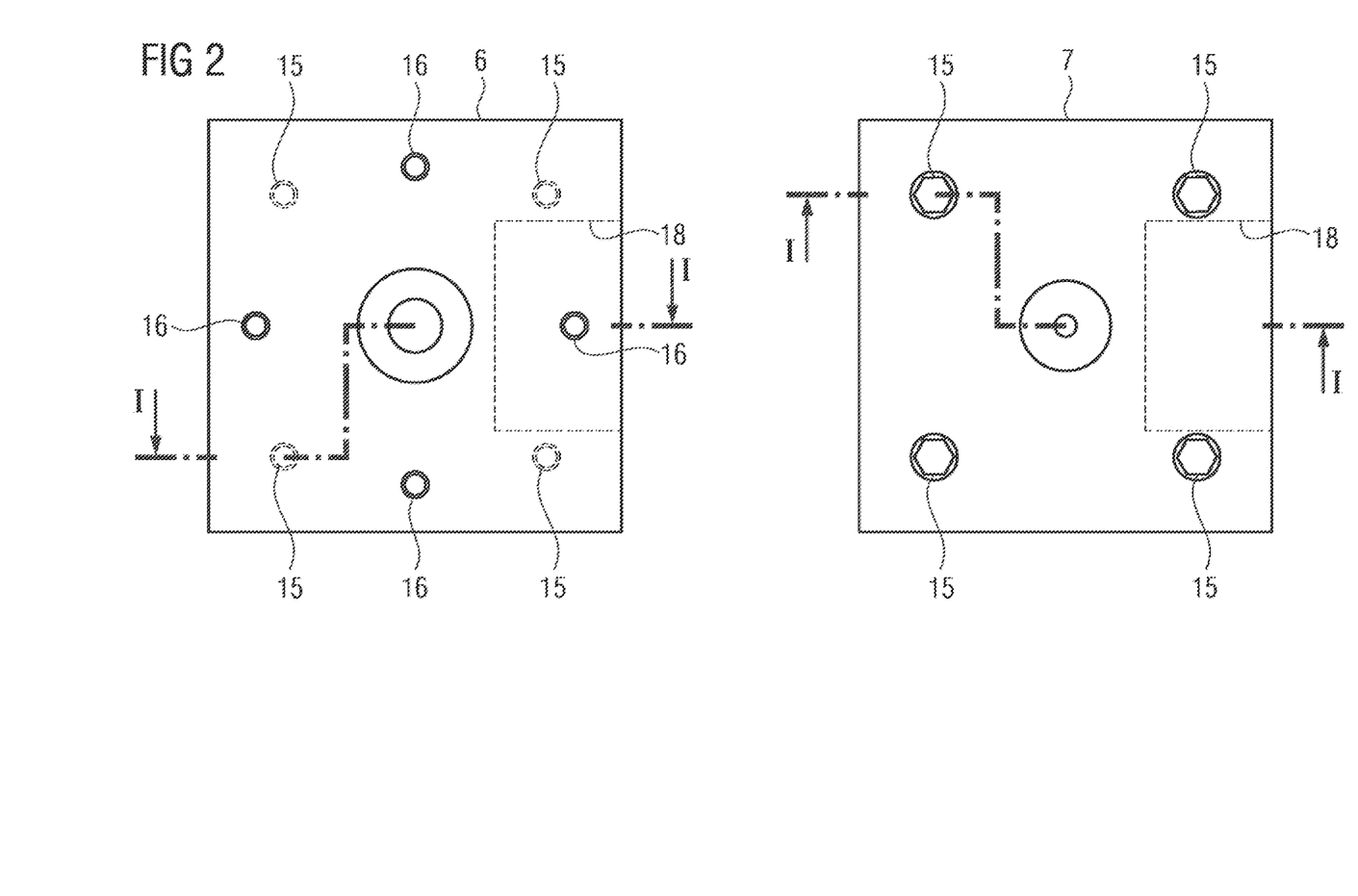
FIG. 2 shows end-side views of an inlet opening fitting and of an outlet opening fitting.

The outlet opening 5 of the insulating fluid channel 3 is closed by the outlet fitting 7. A valve body 9 which serves to close the outlet opening 5 is also located in the outlet fitting 7. Here, too, an annular groove is introduced in the joining gap between the outlet fitting 7 and the supporting body 2, said annular groove having a sealing ring inserted therein in order to ensure a sealing closure between the supporting body 2 and the outlet fitting 7. In order to ensure that the sealing assemblage between the supporting body 2 and the inlet fitting 6 and the outlet fitting 7 is secured, a plurality of long bolts 15 are provided. Owing to the position of the sectional plane according to FIG. 1, only one of the long bolts 15 can be seen. The position of a plurality of long bolts 15 can be seen in FIG. 2. The long bolts 15 pass through through-openings in the outlet fitting 7 and in the supporting body 2 and engage into threaded blind bores in the inlet fitting 6. With interposition of the supporting body 2, the inlet fitting 6 and the outlet fitting 7 can be pulled against one another. The inlet fitting 6 comprises cutouts in order to receive short bolts 16 (position indicated in FIG. 1). The position and relative position of the short bolts 16 is shown in FIG. 2. In this case, the short bolts 16 engage into threaded blind bores in a wall of the encapsulation housing 11, with the result that the inlet fitting 6 is pressed with a face facing away from the supporting body 2 against a wall of the gas space 10. A joining gap produced between the inlet fitting 6 and the wall of the encapsulation housing 11 is sealed by way of a sealing ring which is inserted into an annular groove, the annular groove being oriented concentrically with respect to the inlet opening 4. This construction ensures that the inlet fitting 6 is connected to the encapsulation housing 11 in an angularly rigid manner, such that communication between the insulating fluid channel and the gas space 10 is ensured in a controlled manner by way of the valve body 9 of the valve of the inlet fitting 6. By way of the long bolts 15, the supporting body 2 and the outlet fitting 7 are now also connected to the encapsulation housing 11 in an angularly rigid manner by way of the inlet fitting 6. By way of example, provision is made here for the angularly rigid connection both of the inlet fitting 6 and of the outlet fitting 7 to be ensured by one and the same long bolt 15. However, provision may also be made for the inlet fitting 6 to be connected, independently of the outlet fitting 7, in each case individually to the supporting body 2 by way of separate fastening means.

The insulating fluid channel 3 extends with a linear course from the inlet opening 4 to the outlet opening 5. Arranged perpendicularly with respect to the insulating fluid channel 3 is a branch channel 17 which opens out into the insulating fluid channel 3 on the sheath side 3. At that end of the branch channel 17 which faces away from the insulating fluid channel 3, said branch channel opens out in a cutout 18. The cutout 18 is introduced into a face (side) of the supporting body 2 in the manner of a blind hole. The base area of the cutout 18 may be of variable design in this case. Depending on requirements, a rectangular, a multi-sided, a circular, an elliptical, a polygonal, etc., cross section may be concerned in this case. The branch channel 17 opens out in the bottom region (base area) of the cutout 18. As an alternative, provision may also be made for the cutout 18 to be connected directly to the insulating fluid channel 3. A sensor element 19 is arranged in the cutout 18. The sensor element 19 comprises an active part 19a and a passive part 19b. The active part 19a of the sensor element 19 corresponds with the branch channel 17 and thus the active part 19a of the sensor element 19 is exposed to an insulating fluid located in the branch channel 17 or in the insulating fluid channel 3. In order to close the branch channel 17 and thus also the insulating fluid channel 3 in a fluid-tight manner, a closure means 20 is provided. In the present case, the closure means 20 is introduced into the cutout 18 in the manner of a potting, the sensor element 19 being, at least in certain portions, part of a fluid-tight barrier of the closure means 20. To this end, the sensor element 19 is embedded into the closure means 20 by potting. The closure means 20 is advantageously an electrically insulating solid material, which is introduced in liquid form into the cutout 18 for the purpose of potting. In relation to the shut-off direction of the closure means 20, the active part 19a is oriented in the direction of the branch channel 17 or of the insulating fluid channel 3, whereas the passive part 19b is oriented in the direction of a cover 21 spanning the cutout 18. In the present case, the passive part 19b is also at least partially embedded into the closure means 20 and, as a result, fixed in an angularly rigid manner. By way of example, the passive part 19b comprises a plate which is mounted in a positionally fixed manner by embedding into the closure means 20. The passive part 19b comprises an interface in order to be connected to a data interface 22 located in or on the cover 21. The data interface 22 is for example a socket or a plug so as to enclose a line which serves to pass on data from the sensor element 19. As an alternative, the data interface 22 may also be of line-less configuration, in order to for example transmit data in the form of light or other radiation. To this end, the data interface 22 may for example comprise an antenna or an optocoupler. In order to connect the data interface 22 to the sensor element 19, provision is made in the present case for there to be a plug-in connection between the data interface 22 and the sensor element 19. As an alternative, a wire connection in the form of a flexible line between the data interface 22 and the sensor element 19 may also be provided.

The insulating fluid monitoring block 1 serves to monitor an electrically insulating insulating fluid located in the gas space 10. By way of the inlet fitting 6 and the inlet opening 4 of the insulating fluid channel 3 and the branch channel 17, the insulating fluid to be monitored is conducted to the active part 19a of the sensor element 19. Depending on the configuration of the sensor element 19, one or more physical properties of the insulating fluid can be monitored. By way of example, the temperature, the density, the pressure, the composition of the insulating fluid, etc., may be detected by the sensor element 19. Depending on the configuration, the sensor element 19 can detect one or more physical variables. Depending on requirements, a plurality of insulating fluid monitoring blocks 1 with different sensor elements 19 which serve to detect different physical variables may be connected to one another by way of the respective inlet and outlet fittings 6, 7. By way of the respective insulating fluid channels 3 of the respective insulating fluid monitoring blocks 1, it is possible for the cascade-like insulating fluid to be distributed, proceeding from the gas space 10, to the respective sensor elements 19 of the plurality of insulating fluid monitoring blocks 1 which are interconnected one behind the other.

In order to transmit data which are acquired by the sensor element 19, it is for example possible to use a transmission bus. A suitable bus is for example the Modbus or the Modbus protocol. When using a plurality of insulating fluid monitoring blocks 1 or a plurality of sensor elements 19, a connection in the manner of a "Daisy Chain" is possible by way of a common line.

If only one insulating fluid monitoring block 1 is used, the outlet fitting 7 is available at the end side. Even when a plurality of insulating fluid monitoring blocks 1 are coupled, an outlet fitting 7 is available at the end side. A further discrete sensor element may also be coupled to this outlet fitting 7 by way of the interface present there. This can be exchanged as required. This can also be used with an application of pressure to the insulating fluid channel, since a leakage of insulating fluid from the outlet opening 5 of the insulating fluid channel 3 is counteracted by way of a valve body 9 of the outlet fitting 7. Such a further sensor element may for example be a discrete density monitor.

FIG. 2 shows the end side in each case of the inlet fitting 6 and the outlet fitting 7. Around the centrally arranged insulating fluid channel 3, which is in each case behind the inlet fitting 6 and outlet fitting 7 with respect to the plane of the drawing, the position of the long bolts 15 and of the short bolts 16 in the respective fittings 6, 7 is illustrated. It can be seen that the long bolts 15 and the short bolts 16 are arranged at the corners of a square on similar circular paths. The position of the long bolts 15 and of the short bolts 16 is provided so as to be offset relative to one another with respect to the linear course of the insulating fluid channel 3. This offers the possibility of using the long bolts 15 for connection of the inlet fitting 16 and of the outlet fitting 7 with interposition of the supporting body 2 and of additionally admitting short bolts 16 for fastening of the inlet fitting 6 to the encapsulation housing 11. An offset between the positions of the long bolts and of the short bolts 16 is effected by about 45° in relation to the longitudinal axis of the insulating fluid channel 3. As an alternative, however, provision may also be made for the inlet fitting 6 and the supporting body 2 to be embodied independently of a connection of the outlet fitting to the supporting body 2. As a result, it is possible to embody an angularly rigid connection between the inlet fitting 6 and the supporting body 2, and the outlet fitting 7 and the supporting body 2, independently of one another.

Figure 3:
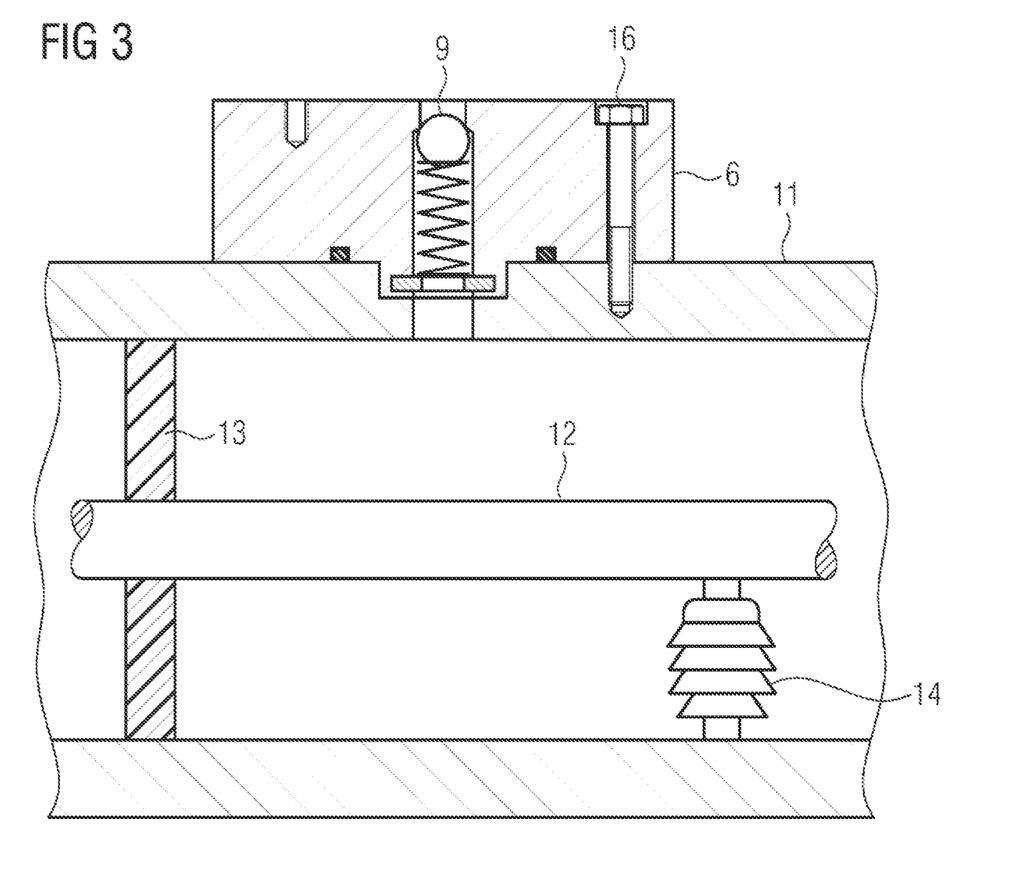
FIG. 3 shows a first mounting step of an insulating fluid monitoring block.
Figure 4:
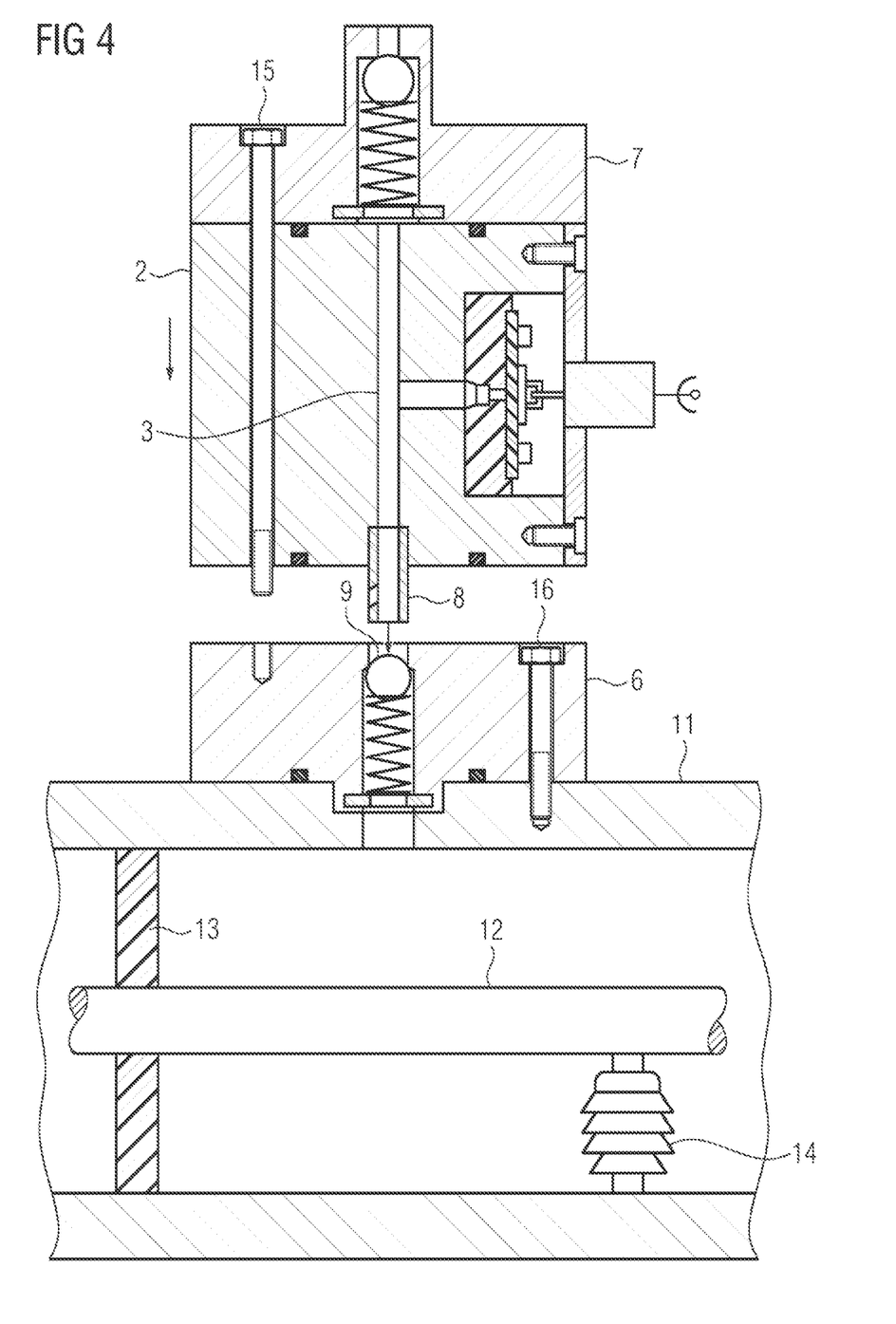
FIG. 4 shows a second mounting step of an insulating fluid monitoring block.

Mounting of an insulating fluid monitoring block 1 on an encapsulation housing 11 will now be described on the basis of FIGS. 3 and 4. The inlet fitting 6 is fixed to a cutout in the encapsulation housing 11 in an angularly rigid manner by way of the short bolts 16. Between the inlet fitting 6 and the encapsulation housing 11, a fluid-tight seat is provided owing to the use of a sealing ring. On account of the valve body 9 in the inlet fitting 6, the cutout in the encapsulation housing 11 is closed in a fluid-tight manner. In order to complete the insulating fluid monitoring block 1, the supporting body 2 together with outlet fitting 7 located thereon is moved onto the inlet fitting 6 in the direction of the course of the fluid channel 3. This state is illustrated in FIG. 4, the long bolts 15 present there already position the position of the outlet fitting 7 relative to the supporting body 2. However, still no bracing of the outlet fitting 7 with the supporting body 2 is possible. As the supporting body 2 together with outlet fitting 7 is moved closer, the actuating means 8 moves closer to the valve body 9 of the inlet fitting 6. In this case, the actuating means 8 is designed in such a way that the valve body 9 is actuated in a travel-controlled manner, that is to say with progression of the supporting body 2 moving closer to the inlet fitting 6. In this case, the dimensioning of valve body 9 and actuating means 8 is selected in such a way that actuation of the valve body 9 begins once a sealing action of the sealing ring located in the joining gap between the supporting body 2 and the inlet fitting 6 is achieved. Shortly before this moment, the long bolts 15 may engage into threaded cutouts in the inlet fitting 6. The tightening of the long bolts 15 has the effect of pressing the supporting body 2 against the inlet fitting 6 and ensuring a sealing action in the joining gap between the supporting body 2 and the inlet fitting 6. At the same time, tensioning and securing of the outlet fitting 7 on the supporting body 2 may also be effected, such that there, too, a fluid-tight assemblage can be formed. The insulating fluid monitoring block 1 is now securely connected to the encapsulation housing 11.

As an alternative, however, provision may also be made for the outlet fitting 7 to be connected to the supporting body 2 independently of a connection of the supporting body 2 to the inlet fitting 6 and thus for a fluid-tight seat between the outlet fitting 7 and the supporting body 2 to already be present prior to a connection of the inlet fitting 6 to the supporting body 2.

The invention claimed is:

1. An insulating fluid monitoring block, comprising:
   a supporting body, said supporting body having an insulating fluid channel with an inlet opening and an outlet opening, and said supporting body having a cutout formed therein;
   a branch channel connecting said cutout to said insulating fluid channel; and
   a sensor element at least partially projecting into said cutout formed in said supporting body, said sensor element at least partly creating a fluid-tight closure of said cutout.

2. The insulating fluid monitoring block according to claim 1, which further comprises a cover spanning and closing said cutout.

3. The insulating fluid monitoring block according to claim 2, wherein said cover includes a data interface.

4. The insulating fluid monitoring block according to claim 1, wherein said sensor element includes an active part and a passive part, said active part is exposed to said insulating fluid channel and said passive part is configured to process information from said active part.

5. The insulating fluid monitoring block according to claim 1, which further comprises an inlet fitting having a valve body controlling said inlet opening.

6. The insulating fluid monitoring block according to claim 1, wherein said supporting body has mutually opposite ends, said insulating fluid channel has a linear course and an outlet opening, and said inlet opening and said outlet opening are each disposed at a respective one of said mutually opposite ends.

7. The insulating fluid monitoring block according to claim 6, which further comprises:
   an inlet fitting closing said inlet opening and an outlet fitting closing said outlet opening;
   said inlet fitting and said outlet fitting each having fastening points distributed around said respective inlet opening and outlet opening; and
   said fastening points being disposed offset relative to one another in an alignment direction.

8. The insulating fluid monitoring block according to claim 1, wherein said supporting body has a substantially cuboid shape or cubic shape.

9. The insulating fluid monitoring block according to claim 1, wherein said inlet opening includes an actuating element for a valve body for controlling access to said insulating fluid channel.

10. The insulating fluid monitoring block according to claim 1, wherein said insulating fluid channel is configured to be coupled to a gas space of an encapsulation housing of an electrical energy transmission device.

11. A method for mounting an insulating fluid monitoring block, the method comprising:
    providing a supporting body having an insulating fluid channel with an inlet opening and an outlet opening;
    connecting an inlet fitting to a fluid container wall;

using the inlet fitting to close the inlet opening of the insulating fluid channel; and using an outlet fitting to close the outlet opening of the insulating fluid channel prior to closing the inlet opening with the inlet fitting.

12. The method for mounting an insulating fluid monitoring block according to claim 11, which further comprises using an outlet fitting to close an outlet opening of the insulating fluid channel, using the inlet fitting to close the inlet opening, and carrying out the closing of the inlet opening and the outlet opening in a common working step.

13. The method for mounting an insulating fluid monitoring block according to claim 12, which further comprises using an actuating element to actuate a valve body along with closing the inlet opening with the inlet fitting.

* * * * *

UNITED STATES PATENT AND TRADEMARK OFFICE
CERTIFICATE OF CORRECTION

PATENT NO. : 12,474,247 B2
APPLICATION NO. : 18/261197
DATED : November 18, 2025
INVENTOR(S) : Thomas Lehmann et al.

Page 1 of 1

It is certified that error appears in the above-identified patent and that said Letters Patent is hereby corrected as shown below:

In the Claims

Claim 12, Column 15, Lines 6-11 should read as follows:
12. The method for mounting an insulating fluid monitoring block according to claim 11, which further comprises carrying out the closing of the inlet opening, and the outlet opening in a common working step.

Claim 13, Column 15, Lines 12-15 should read as follows:
13. The method for mounting an insulating fluid monitoring block according to claim 11, which further comprises using an actuating element to actuate a valve body along with closing the inlet opening with inlet fitting.

Signed and Sealed this
Sixth Day of January, 2026

John A. Squires
*Director of the United States Patent and Trademark Office*